United States Patent [19]

DiIorio et al.

[11] Patent Number: 5,016,128
[45] Date of Patent: May 14, 1991

[54] SUPERCONDUCTING INFORMATION STORAGE DEVICE

[75] Inventors: Mark S. DiIorio, San Diego; Stephen E. Robinson, San Diego; Duane B. Crum, San Diego; Douglas N. Paulson, Del Mar; D. Scott Buchanan, San Diego; James R. Marsden, San Diego, all of Calif.

[73] Assignee: Biomagnetic Technologies, Inc., San Diego, Calif.

[21] Appl. No.: 187,017

[22] Filed: Apr. 27, 1988

[51] Int. Cl.$^5$ ............................................. G11B 5/012
[52] U.S. Cl. ................................. 360/97.01; 505/1; 360/110; 360/115
[58] Field of Search ............... 360/110, 113, 115, 125, 360/126, 127; 365/162, 161, 160; 505/842, 843, 845, 846, 1; 324/248, 71.6; 357/5

[56] References Cited

U.S. PATENT DOCUMENTS 4,403,189 9/1983 Simmonds ........................ 324/248
4,454,522 6/1984 deLozanne ........................ 357/5

FOREIGN PATENT DOCUMENTS 60-154315 8/1985 Japan ........................ 360/120
63-246688 10/1988 Japan ........................ 365/162

OTHER PUBLICATIONS

H. Bertram, "Fundamentals of the Magnetic Recording Process," Nov. 1986, Proc. of IEEE, vol. 74, No. 11.
R. H. Koch et al., "Quantum Interference Devices Made from Superconducting Thin Films," Jul. 1987, Appl. Physics Lett. vol. 51(3).
Robert P. Freese, "Optical Disks become Erasable," Feb. 1988, IEEE Spectrum.

Primary Examiner—John H. Wolff
Attorney, Agent, or Firm—Gregory O. Garmong

[57] ABSTRACT

An information storage device includes a magnetic recording medium, preferably supported upon a rotating disk, an electromagnetic writing device that writes magnetic patterns into the recording medium, and a superconducting quantum interference device (SQUID) that reads the magnetic patterns in the recording medium, the writing device and the SQUID preferably being mounted upon a read/write head. The SQUID as operated in its superconducting state is a highly sensitive and directional detector of the magnetic state of the recording medium, permitting it to be spaced relatively distantly from the recording medium yet read the state of small areas of the medium. Use of high temperature superconductors in the SQUID permits practical construction of the information storage device. The read/write head may support a plurality of write devices, and an array of SQUIDs can be utilized so that little or no relative movement of the read/write head is required to read and write from all tracks of the disk.

12 Claims, 2 Drawing Sheets

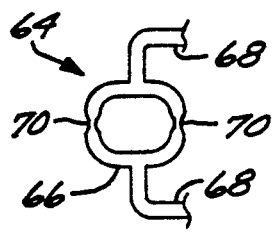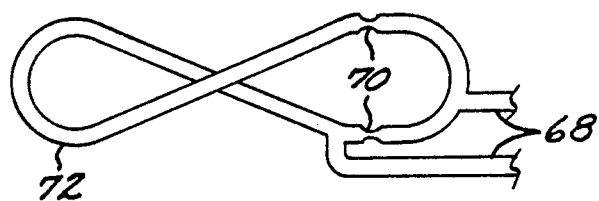
FIG.5  FIG.6
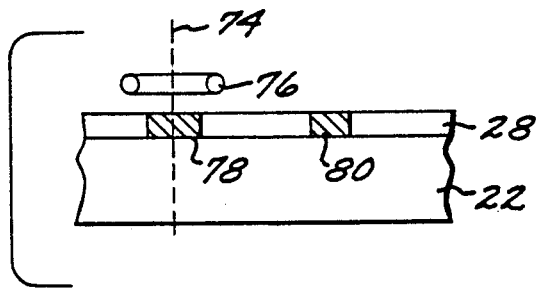
FIG.7
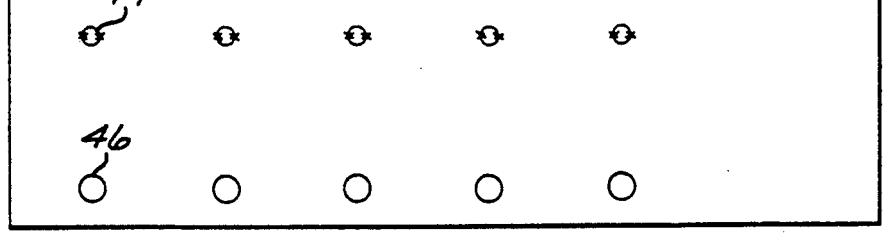
FIG.8
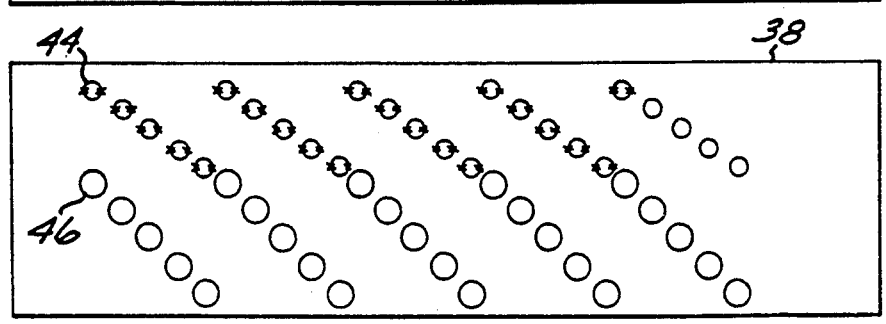
FIG.9
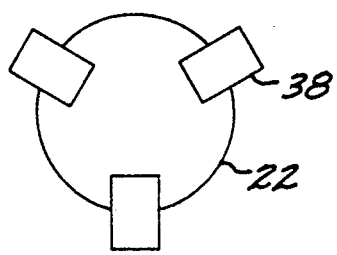
FIG.10

SUPERCONDUCTING INFORMATION STORAGE DEVICE

BACKGROUND OF THE INVENTION

This invention relates to information storage devices, and, more particularly, to the reading of information stored on a magnetic disk.

The modern computer typically has three principal types of components. The processing unit performs computations and manipulations, memory stores instructions and information that is to be processed or has been processed, and input/output devices transmit information into and out of the computer.

There are ordinarily two or three types of memory storage used in the computer. Random access memory is internal to the computer, is usually packaged integrally with the processing unit, and is usually volatile, losing information when power is removed. Information stored in the random access memory is accessible by the processing unit in a very short time. A second type of memory storage is the mass storage device, such as a hard disk, which has a somewhat longer access time but much greater storage capacity. The third type of memory storage is the bulk storage device, typified by tape storage, which has virtually unlimited storage capacity but a much slower access time. Both disk and tape memory are non-volatile, retaining information when power is removed.

The present invention relates to mass storage devices, which can store moderate to large amounts of information with access times typically on the order of milliseconds. In a hard disk storage device, a disk or platter is mounted to rotate in the manner of a conventional phonograph record, typically at a rate of 60 revolutions per second. The parallel faces of the disk are covered with a magnetic storage medium. A read/write head is positioned in close proximity to the surface of the storage medium. A writing device in the head alters the magnetic storage medium to a particular pattern of magnetic states, and a reading device on the same head later reads that same pattern of states to reproduce the information so stored. The information is stored in annular tracks positioned radially outwardly from the center of the disk. The conventional read/write head is movable radially inwardly and outwardly to locate a particular track, and then the information is recorded upon or read from that track. A disk controller operates the disk and read/write functions.

There is a continuing demand for increased memory capacities of the hard disk, increased data readout rates, and decreased access times, as well as for improved reliability. Increased memory capacity is achieved by increasing the diameter of the disk, using both sides of the disk for storage, or stacking several disks together on a common axis in a single unit, and providing read/write heads for each disk that operate in a coordinated fashion. Increased memory capacity can also be achieved by packing more information on each track and more tracks per radial inch. The increased packing demands a greater resolution from the reading head, so that a bit of information can be stored in a smaller area of the disk. This approach, in turn, usually requires that the read sensor in the read/write head be placed closer to the surface of the disk, which serves to decrease the reliability of the disk.

In current disks, the read/write head and the sensors therein are mounted with a separation of less than 1 micrometer from the surface of the rapidly turning disk surface. The close proximity is required because the sensitivity of the memory reading sensor in the head is inadequate to read magnetic fields arising from small areas of the disk surface, when the sensor is placed too far from the disk surface. Disk failures most often occur due to foreign matter such as minute dust particles that lodge between the head and the disk surface and damage the recording medium, or vibrations or bumps that cause the read/write head to impact against the disk surface and damage the medium. With current technology, if the size of the area of each stored bit of information is reduced to increase the packing density of information, the read/write head must be positioned correspondingly closer to the surface of the magnetic storage medium to permit the reading sensor to detect the small magnetic signal emanating from that smaller area, and to distinguish it from the magnetic signal generated by the other nearby stored bits. The closer spacing reduces the disk reliability by increasing the likelihood of contact due to foreign matter or a bump. Thus, the approaches used in the past for achieving improvements cannot be pushed much further due to absolute physical limitations.

Accordingly, a new approach for increasing the memory capacity, reducing the access time, increasing data readout rates, and improving reliability is highly desirable. Such an approach would benefit substantially from maintaining compatibility with existing technology and not requiring a significant change in the computer architecture, but would also be compatible with subsequently developed architectures. The present invention fulfills this need, and further provides related advantages.

SUMMARY OF THE INVENTION

The present invention provides a mass information storage device having substantially increased information storage capacity, increased output data rate, and reduced access times, as compared with existing units. The storage device is preferably configured much like a conventional disk storage device, and utilizes similar controller and computer configurations, thereby minimizing the changes required in the remainder of the computer. The reliability of the storage device, when configured as a disk, is substantially improved over that of conventional disks, because the operating distance between the read/write head and the surface of the disk is increased rather than decreased as in many prior approaches.

In accordance with the invention, an information storage device comprises a magnetic recording medium; and means for reading the magnetic pattern in the recording medium, the means for reading including a superconducting quantum interference device or SQUID. A means for writing a magnetic pattern into the recording medium is preferably provided.

More specifically, an information storage device comprises a cylindrically symmetrical medium support mounted so as to be rotatable about its cylindrical axis; a magnetic recording medium deposited upon a surface of the medium support; a read/write head positioned adjacent the surface of the medium support upon which the magnetic recording medium is deposited; and means for reading the magnetic pattern in the recording medium, the means for reading being mounted on the read/write head and including a superconducting quantum interference device. Typically, a means for writing a magnetic pattern into the recording medium is also provided on the read/write head. The means for writing can include any operable type of device that alters the magnetic state of the recording medium in a readable manner, such as a laser or an electromagnet.

The invention is preferably configured as a hard disk. In such an embodiment, an information storage device comprises a disk mounted so as to be rotatable about its cylindrical axis; a magnetic recording medium deposited upon a surface of the disk; a read/write head positioned adjacent to the surface of the disk upon which the magnetic recording medium is deposited; means for writing a magnetic pattern into the recording medium supported on the read/write head; means for reading the magnetic pattern in the recording medium, the means for reading being mounted on the read/write head and including a plurality of superconducting quantum interference devices positioned adjacent the magnetic recording medium at different radial distances from the axis of the disk; means for cooling the superconducting quantum interference device to a temperature at which the material of the device is in a superconducting state, wherein the means for cooling also cools the disk and the read/write head to substantially the same temperature as the superconducting quantum interference device; and a vacuum tight housing that encloses the disk, the read/write head, the means for writing, and the means for reading.

The reading sensor is a Superconducting QUantum Interference Device, herein generically termed a SQUID as an abbreviation. A conventional SQUID is a loop or series of loops of a metallic conductor having Josephson junctions therein. When made by microelectronic thin-film techniques, the SQUID may have a loop diameter as small as one micrometer. The SQUID is characterized by its ability to detect extraordinarily small magnetic fields. When used in the storage device of the invention, the SQUID may be placed further from the surface of the magnetic storage medium and still detect the signals arising from smaller magnetic regions (domains), as compared with prior magnetic field reading devices, due to its much greater sensitivity.

As suggested by its name, a SQUID must be operated in the superconducting state to take advantage of the superconducting characteristics of Josephson junctions. Until recently, most SQUIDs were operable at room temperatures no greater than about 4.2K ("K" being the accepted symbol denoting degrees Kelvin), although SQUIDs having operating temperatures as high as about 20K were known. It was not practical to consider using SQUIDs in information storage devices of the disk type, because of the difficulties in cooling the apparatus to these very low temperatures.

SQUIDs having much higher operating temperatures have been demonstrated recently, making feasible their use in the present information storage devices. The use of SQUIDs permits an increase in the amount of information stored in an available surface area of disk, by reducing the spacing between stored bits along any particular track, and also increasing the packing density of the tracks per radial inch of disk. The increased packing results directly from the ability of the SQUID to measure the magnetic signal arising from a smaller area than possible with prior sensors. The SQUID is directional, and senses the component of the magnetic field perpendicular to the area of the loop. The SQUID can therefore be placed more distant from the area to be sensed and still effectively perform the sensing function. This characteristic permits (but does not require) the read/write head to be spaced from the magnetic recording medium a greater distance than possible with prior devices, increasing its reliability by decreasing the chances of failure due to dust particles and vibrations. The great sensitivity of the SQUID also permits the use of a wider range of materials for the magnetic recording medium than heretofore possible. The material of the magnetic recording medium must have a magnetization (coercive strength) that is large enough to be detected by the read head, and the SQUID allows the use of materials having lower magnetization that can still be sensed by the detector. In addition, the very high frequency response of the SQUID leads to an increase in the rate at which information can be read from the storage medium.

Because a SQUID can be fabricated in a small size, a large number of SQUIDs can be placed onto a single read/write head at different radial locations. The access time of any particular track on the disk is thereby reduced, since the read/write head either is not moved at all, or moves only a very short distance, to place a reading SQUID over a selected track. A number of SQUIDs can also be placed in the circumferential direction along the read/write head, parallel to a track on the disk surface, so that several bits of information can be read from a track at once.

It will be appreciated that the approach of the present invention yields important advances in the art of mass information storage devices. Storage devices of greater capacity, increased output data rate, reduced access time (higher speed), and greater reliability are made possible. Other features and advantages of the invention will be apparent from the following more detailed description, taken in conjunction with the accompanying drawings, which illustrate, by way of example, the principles of the invention.

BRIEF DESCRIPTION OF THE DRAWINGS

FIG. 5 is a plan view of a single loop SQUID;

FIG. 6 is a plan view of a gradiometer SQUID;

FIG. 7 is a schematic side view of the reading of the magnetic field of a small area using a single loop SQUID;

FIG. 8 is a bottom plan view of the read/write head with a 1-dimensional array of read devices and write devices;

FIG. 9 is a bottom plan view of the read/write head with a 2-dimensional array of read devices and write devices; and FIG. 10 is a top plan view of a disk storage device utilizing multiple read/write heads.

DETAILED DESCRIPTION OF THE PREFERRED EMBODIMENT

Figure 1:
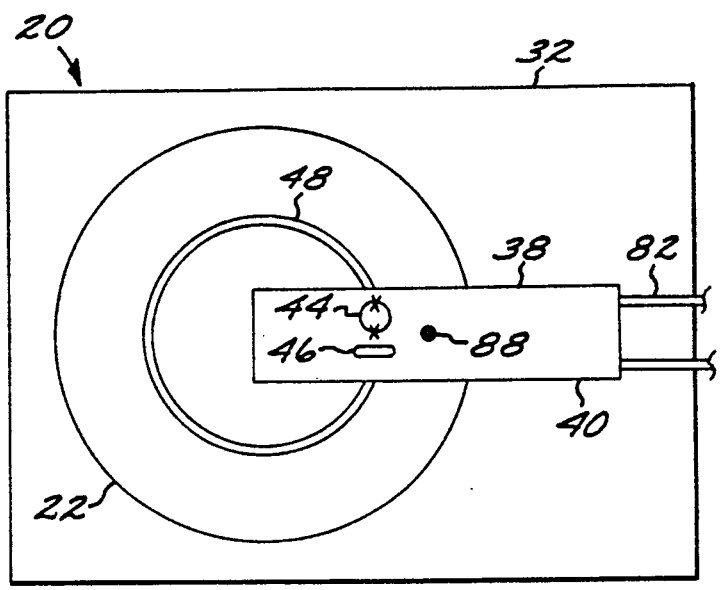
FIG. 1 is a top plan view of an information storage device of the invention, with the enclosure removed and the locations of the read and write devices indicated in a view through the head.
Figure 2:
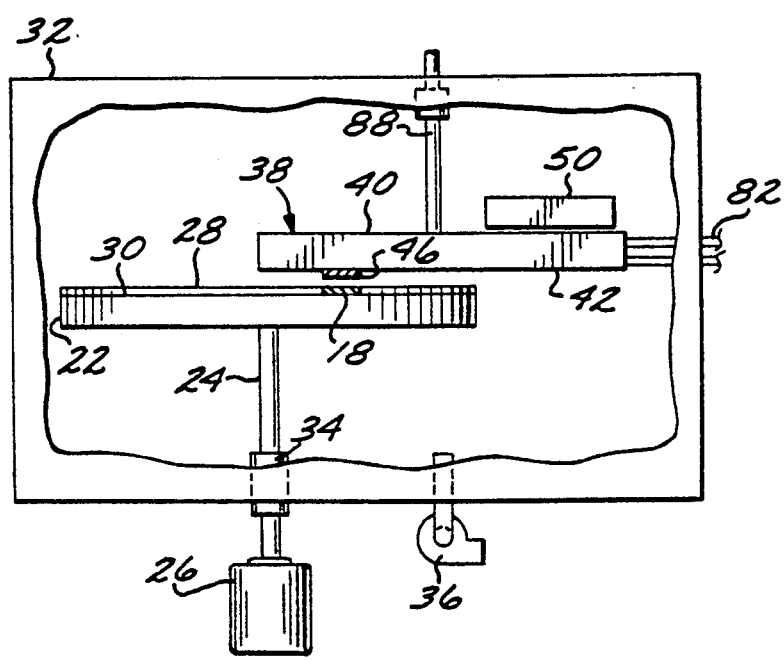
FIG. 2 is a side elevational view of the information storage device of FIG. 1, with a portion of the enclosure wall broken away.

FIGS. 1 and 2 depict an information storage device 20. The device 20 includes a disk 22 (also sometimes termed a platter) rotationally mounted by a shaft 24 to a motor 26, so that the disk 22 can rotate about its cylindrical axis. A rotational speed of 60 Hertz (revolutions per second) is acceptable, but higher speeds may be used as necessary to decrease access time. The disk is made of a stable, nonmagnetic material such as an aluminum alloy.

Preferably, the disk 22 and other components of the device 20 are placed into a hermetically sealed enclosure 32. The shaft 24 passes through the wall of the enclosure 32 by a rotating seal 34, with the motor 26 outside the enclosure 32. Optionally, and as illustrated, the interior of the enclosure may be pumped to a reduced pressure by a vacuum pump 36. Reduction of the pressure within the enclosure 32 reduces the heat transfer with the surroundings and decreases the wind resistance of the spinning disk.

A layer 28 of a magnetic recording medium resides on one of the broad faces 30 of the disk 22. (The magnetic recording medium can also be applied to both of the broad faces 30, and a second read/write head can be furnished, to increase the storage capacity of the disk 22. The presently preferred embodiment utilizes a magnetic recording medium on only one side of the disk, and that embodiment will be described in detail.) The material of the recording medium is one that can be transformed between magnetic states by an external agency. Examples of acceptable recording medium materials include cobalt, iron, nickel, alloys of these three materials, colbat-20 atomic percent chromium, and their ferromagnetic oxides (termed "ferrites"). These medium materials are deposited onto the face 30 by a technique acceptable for the recording medium material chosen. Common techniques are vapor deposition, sputtering, and electroplating. The thickness of the layer 28 of the recording medium material is typically from about 50 nanometers to about 2 micrometers. The most preferred recording medium material is cobalt-20 atomic percent chromium, deposited directly upon the face 30 of the disk 22 by sputter deposition, in a thickness of 100 nanometers.

Positioned adjacent the medium layer 28 of the disk 22 is a read/write head 38. The read/write head 38 includes an elongated housing 40 extending radially outwardly so that one end of the housing 40 is located near to the cylindrical axis of the disk 22, and the other end extends past the outer periphery of the disk 22.

Mounted upon the underside 42 housing 40 of the read/write head 38, closest to the layer 28, are a series of read devices 44 and write devices 46. The information storage device 20 is operable with a single read device 44 and a single write device 46 that can be moved radially with respect to the disk 22, to be positioned above any selected track 48 of the disk 22 for reading and writing. (Multiple read devices 44 and write devices 46 can also be used, as will be described.) A linear movement actuator 50 is provided to move the read/write head 38 radially with respect to the surface of the disk 38, to position the devices 44 and 46 above the selected track 48.

The read devices and write devices can be made quite small, permitting the construction of a 1-dimensional or 2-dimensional array of devices. FIG. 8 illustrates the underside 42 of another read/write head 38. There is a radially extending row of read devices 44 and a parallel row of write devices 46. The use of a plurality of each type of device 44 and 46 reduces the distance that some device must be moved to be over a particular track, thereby shortening the access time to address the selected track. If one read device and one write device can be placed over each track, no actuator 50 is required. Otherwise, an actuator may still be necessary to move the devices 44 and 46 a short distance to overlie a track. In current disk memory devices, the time required for the mechanical movement of the read/write head comprises most of the access time for particular stored information, so that reduction of the distance that the read/write head 38 must be moved directly reduces the access time for information.

In an even more versatile approach illustrated in FIG. 9, a 2-dimensional array of read devices 44 and a 2-dimensional array of write devices 46 are placed on the underside 42 of the head 38. The two dimensioinal arrays are used to permit smaller radial spacing of the devices 44 and 46, for any particular type and size of device. Thus, a read device 44 is over each track 48, and the maximum time for locating information on the track is the time required for the disk 22 to make one revolution on its axis. The same is true for writing onto a track with the write devices 46.

Ideally, with a sufficient number of devices 44 and 46, it is not necessary to move the read/write head 38 at all to access every track of the information storage device 20. The preferred read devices 44 can be made very small, using microelectronic techniques, and can be so closely spaced that again physical movement is not necessary to address any selected track on the disk 22. With the invention in this form, the maximum access time is reduced to the time required for one revolution of the disk 22.

FIG. 10 shows another approach to decreasing the access time for information, by shortening the time required to move a segment of a track under a head 38. Three heads 38 are spaced around the circumference of the disk 22, with read devices 44 and write devices 46 arrayed on each head in the manner illustrated in FIG. 9 or FIG. 8. The access time is then ⅓ of the time required for one revolution of the disk 22. In principle, the coverage of the head by devices 44 and 46 could be further increased, but the control problems also increase with increasing numbers of devices.

Figure 3:
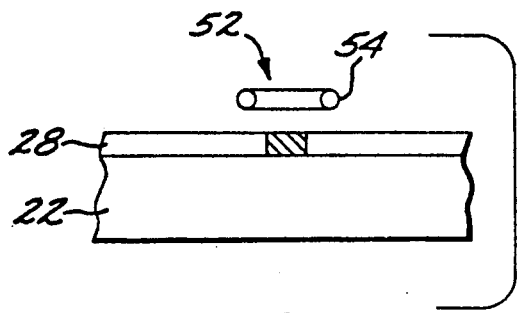
FIG. 3 is a schematic side view of the writing of a magnetic pattern with an electromagnetic write device.
Figure 4:
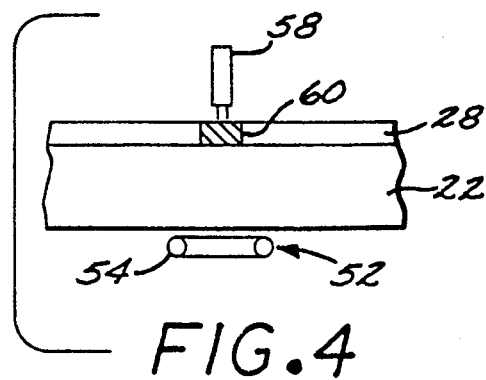
FIG. 4 is a schematic side view of the writing of a magnetic pattern with a laser optic write device.

Two specific forms of write devices 46 are illustrated in FIGS. 3 and 4. FIG. 3 depicts a single loop coil electromagnet 52 mounted adjacent the recording medium layer 28 of the disk 22. When the electromagnet 52 is energized by a current through the coil 54 in a first direction, a magnetic field of a first orientation is induced in the portion of the medium layer 28, immediately below the coil. Applying a current through the coil 54 in a reversed direction produces a magnetic field of a second orientation in the portion of the layer 28 immediately below the coil. These different oreintations of the magnetic field can be sensed by the read device 44.

Another approach is shown in FIG. 4, using an electromagnet 52 with a coil 54 similar in configuration and operation to that of FIG. 3, except in this approach the coil 54 is mounted below the disk 22 in such a way that its field can penetrate through the disk to the layer 28 of the recording medium. A laser 58 is positioned to heat a region 60 of the medium layer 28. To create a magnetic field of a first orientation in the region 60, the region 60 is heated by the laser 58 to a temperature above its Curie temperature and then permitted to cool to below the Curie temperature with the electromagnet 52 energized. The magnetic field is erased (equivalent to inducing a second measurable state in the region 60) by heating the region 60 to a temperature above its Curie temperature with the laser 58, and then permitting it to cool to below the Curie temperature without the electromagnet 52 energized, so that there is no applied magnetic field and the region 60 has no resulting magnetic orientation. The laser beam can be focussed electronically and aimed by a laser controller (not shown) within the geometrical limits imposed by the geometry of the read/write head 38.

The read device 44 is a superconducting quantum interference device (SQUID). The construction of two types of SQUIDs are illustrated in FIGS. 5 and 6, and their use to measure magnetic fields is illustrated in FIG. 7. The simplest SQUID is a single loop SQUID 64, FIG. 5. Such a SQUID is formed from a loop of conductor material 66 with leads 68. Although illustrated as a circular loop, the loop may be rectangular, square, or other closed loop configuration. At spaced positions on the loop of conductor material 66, separated by the leads 68, are a pair of Josephson junctions 70. The various methods of the preparation of SQUIDs are known to those skilled in the art. Examples of such methods are disclosed in U.S. Pat. Nos. 4,403,189 and 4,386,361, whose disclosures are incorporated herein by reference. The electronics used in conjunction with SQUID measurements is also known to those skilled in the art. Examples of such electronics are disclosed in U.S. Pat. Nos. 4,389,612, 4,004,217, and 3,622,881, whose disclosures are incorporated herein by reference.

Another configuration of a SQUID is the gradiometer design of FIG. 6. Here the loop is flipped upon itself to form a figure 8 configuration 72. The advantage of a gradiometer SQUID over the single loop SQUID of FIG. 5 is that it can reject undesirable background magnetic fields.

A SQUID is sensitive to magnetic fields, and most strongly sensitive to magnetic fields parallel to the cylindrical axis 74 of the single loop SQUID 76, as illustrated in FIG. 7. That is, the SQUID 76 detects the state of a first region 78 located along the axis 74, more strongly than the state of a second region 80 not located along the axis 74.

A SQUID such as the SQUID 76 is so strongly sensitive that the spacing from the SQUID 76 to the region 78 under measurement may be made larger than the spacings used in prior disk reading devices. As an example, a SQUID 76 with a 2 micrometer loop diameter can readily sense a magnetized region (domain) about 0.5 micrometers in size having a coercive force of $5 \times 10^4$ Amps per meter at a distance of over 5 micrometers. The read/write head 38 using such SQUIDs could then be spaced several micrometers from the disk 22. By comparison, the read/write heads of prior conventional disks are spaced from the disks about 0.5 micrometers, increasing the chances of failure caused by foreign matter or vibration, which are the most common failure modes. The information storage device of the present invention is therefore significantly more reliable than prior devices.

The SQUIDs of the present invention are made of high critical temperature ($T_c$) superconductor materials, preferably with $T_c$ values above 77K. Superconductors having $T_c$ greater than about 120K are known, and SQUIDs have been constructed of materials having $T_c$ values of about 80K. See R. H. Koch et al., "Quantum interferences devices made from superconducting oxide thin films," *Appl. Phys. Lett.* 51(3), Jul..20, 1987, pages 200–202. Briefly, as there reported, a SQUID having a 40 micrometer by 40 micrometer loop with two 17 micrometer wide weak link Josephson junctions was made by electron beam evaporating the nominal composition $YBa_2Cu_3O_y$ (where y is about 7) onto magnesium oxide or aluminum oxide substrates. Evaporation was accomplished from metal sources with the substrate heated to 400° C., in a partial pressure of oxygen of $10^{-3}$ to $10^{-4}$ Torr, to produce a metallic film. After evaporation, the film was annealed in oxygen at atmospheric pressure in an oven at 900° C. The nominal thickness of the evaporated metal was about 400 nanometers, but after annealing the oxide was about 1 micrometer thick. The deposition rates during evaporation were adjusted to yield an average composition of about $Y_{0.8}Ba_{1.5}Cu_3O_y$ (where y is about 7), which gave the best compromise between a high $T_c$ and a small grain size.

The deposited film was patterned by vapor depositing a 0.5 micrometer thick film of gold over the superconducting oxide, and depositing and patterning a negative organic resist over the gold. The pattern was exposed and developed, and the exposed gold removed to form the SQUID. Optionally the film can be patterned by ion implantation. The SQUID was mounted on a support, and the leads were ultrasonically bonded with aluminum wire. The resulting device was operable over the range from 4.2K to 68K, and the results were described more fully in the referenced publication, which is herein incorporated by reference.

As further high temperature superconductors are developed having even higher $T_c$, the maximum operating temperature of the present invention can be increased by making the SQUIDs of such materials.

By this technique, single SQUIDS or 1-dimensional or 2-dimensional arrays of SQUIDs are fabricated for use in the device 20, by forming an elongated strip of the superconducting oxide and patterning a plurality of SQUIDs into the layer. Alternatively, the SQUIDs can be fabricated separately and positioned as desired on the underside of the read/write head 38.

The SQUID or SQUIDs on the read/write head 38 must be cooled to a temperature below their $T_c$ to operate properly. The preferred approach to cooling the SQUIDs is to place a cooling line 82 within the interior of the read/write head 38. Chilled gas is passed through the line 82, cooling the read/write head and the SQUIDs mounted thereupon. The chilled gas is one whose boiling point is below the operating temperature of the SQUIDs. Where $T_c$ of the superconductor in the SQUID is above 77K, as preferred, the gas is preferably nitrogen. The chilled gas is cooled to below the operating temperature of the SQUIDs but still above the boiling point externally, as by passing the gas line 82 through a bath of a liquid gas, and then pumping it to the head 38. In this approach, only the read/write head 38 is directly cooled, with the SQUID read device 44 cooled by conduction from the interior of the head 38.

Alternatively, the disk 22 or the entire enclosure 32 can also be cooled. Desirably, enough cooling power is provided so that the entire read/write head 38 and possibly the disk 22 are cooled to a temperature below the critical temperature and maintained at that constant temperature. Fluctuations and performance variations due to changes in thermal expansion can thereby be avoided during operation of the device 20. The use of high temperature superconductors in the SQUID read device 44 makes possible this application, as it would not be feasible to build an information storage device of this type, but where the SQUID read device had to be cooled to the neighborhood of 4K.

Another, but less preferred, approach is to locate a MMR (microminature refrigerator) on the read/write head, and thermally connect the SQUIDs to the MMR by a good thermal conductor. The MMR operates by supplying a pressurized gas such as helium through an input tube to a nozzle in the MMR. The gas expands through the nozzle, absorbing heat from the surroundings. The expanded gas is conducted away through an output tube, to be recycled. MMRs capable of cooling to temperatures below 77K are available from the Microminiature Refrigerator Co.

Because the use of SQUIDs as the read devices 44 permits the tracks 48 to be more closely spaced in the direction of the disk radius, thermal expansion fluctuations are of greater concern than for prior types of disks. The requirement of a thermal control system as just described reduces the likelihood of adverse changes during operation. Reference tracks can also be provided, so that the location of tracks relative to the reference track is readily determined, regardless of thermal expansion.

Preferably, the read/write head 38 is adjustable to counteract the effects of thermal expansion. The read/write head 38 is mounted to a vertical shaft 88 that can be rotated externally. Rotation of the shaft 88 rotates the entire read/write head 38 so as to introduce a linear movement of the devices 44 and 46, the distance of movement being proportional to the cosine of the rotational angle and the distance of the device from the shaft 88. If the movement of the tracks due to thermal expansion is sensed, the read/write head 38 is rotated to compensate for the movement of the tracks.

In the preferred embodiment just described, the invention has been described in relation to a disk drive, such as a computer peripheral disk storage unit. The invention is equally applicable in other contexts, such as disk drives for other applications, tape drives for storing computer generated information, video information as in video cassette recorders, and audio information as in audio players, and the like. The invention is also applicable to other types of magnetic storage devices.

Although a particular embodiment of the invention has been described in detail for purposes of illustration, various modifications may be made without departing from the spirit and scope of the invention. Accordingly, the invention is not to be limited except as by the appended claims.

What is claimed is:

1. An information storage device, comprising:
    a medium support mounted so as to be rotatable about an axis of rotation;
    a magnetic recording medium deposited upon a surface of said medium support;
    a read/write head head positioned adjacent the surface of said medium support upon which said magnetic recording medium is deposited;
    means for writing a magnetic pattern into said recording medium, said means for writing being mounted on said read/write head; and
    means for reading the magnetic pattern in said recording medium, said means for reading being mounted on said read/write head and including a superconducting quantum interference device.

2. The information storage device of claim 1, wherein said medium support is a disk.

3. The information storage device of claim 1, further including
    means for cooling said superconducting quantum interference device to a temperature at which the material of said device is in a superconducting state.

4. The information storage device of claim 1, wherein a plurality of superconducting quantum interference devices are present, and the superconducting quantum interference devices are arranged in a 1-dimensional array.

5. The information storage device of claim 1, wherein a plurality of superconducting quantum interference devices are present, and the superconducting quantum interference devices are arranged in a 2-dimensional array.

6. The information storage device of claim 1, further including
    a vacuum tight housing that encloses said medium support, said read/write head, said means for writing, and said means for reading.

7. The information storage device of claim 1, wherein said means for reading includes a plurality of superconducting quantum interference devices, at least some of said devices being positioned so that different regions of said recording medium pass adjacent different ones of said devices, as said medium support turns on its axis.

8. The information storage device of claim 1, wherein said superconducting quantum interference device comprises a single loop of conductor material.

9. The information storage device of claim 1, wherein said superconducting quantum interference comprises a gradiometer configuration.

10. An information storage device, comprising:
    a disk mounted so as to be rotatable about its cylindrical axis;
    a magnetic recording medium deposited upon a surface of said disk;
    a read/write head positioned adjacent to the surface of said disk upon which said magnetic recording medium is deposited;
    means for writing a magnetic pattern into said recording medium supported on said read/write head;
    means for reading the magnetic pattern in said recording medium, said means for reading being mounted on said read/write head and including a plurality of superconducting quantum interference devices positioned adjacent said magnetic recording medium at different radial distances from the axis of said disk;
    means for cooling said superconducting quantum interference device to a temperature at which the material of said device is in a superconducting state, wherein said means for cooling also cools said disk and said read/write head to substantially the same temperature as said superconducting quantum interference device; and
    a vacuum tight housing that encloses said disk, said read/write head, said means for writing, and said means for reading.

11. The information storage device of claim 10, wherein the superconducting quantum interference device is made of a material having a superconducting transition temperature of greater than about 80K.

12. The information storage device of claim 10, further including a plurality of read/write heads positioned adjacent the surface of the disk.

* * * * *